United States Patent [19]

Seneker

[11] Patent Number: 4,532,299

[45] Date of Patent: Jul. 30, 1985

[54] FLEXIBILIZED CHEMICALLY RESISTANT EPOXY RESIN

[75] Inventor: James A. Seneker, Anaheim, Calif.

[73] Assignee: Ameron, Inc., Monterey Park, Calif.

[21] Appl. No.: 459,793

[22] Filed: Jan. 21, 1983

Related U.S. Application Data

[63] Continuation-in-part of Ser. No. 338,876, Jan. 12, 1982, abandoned.

[51] Int. Cl.$^3$ ............................................. C08F 283/10
[52] U.S. Cl. ..................................... 525/122; 525/112; 525/187; 525/237; 525/241; 525/529; 525/530; 528/110; 528/297
[58] Field of Search ............... 525/122, 187, 237, 241, 525/529, 530, 112; 528/110, 297

[56] References Cited

U.S. PATENT DOCUMENTS

| | | | |
|---|---|---|---|
| 3,296,186 | 1/1967 | Gunkel | 525/529 |
| 3,989,610 | 11/1976 | Tsukada et al. | 525/529 |
| 4,014,771 | 3/1977 | Rosenkranz et al. | 525/529 |
| 4,016,022 | 4/1977 | Browning et al. | 525/529 |
| 4,025,578 | 5/1977 | Siebert | 525/529 |
| 4,173,593 | 11/1979 | Smith et al. | 525/529 |
| 4,284,753 | 8/1981 | Hewitt, Jr. | 525/529 |

*Primary Examiner*—Lester L. Lee
*Attorney, Agent, or Firm*—Christie, Parker & Hale

[57] ABSTRACT

A method for flexibilizing an epoxy resin is disclosed which comprises (a) preparing a dicarboxy-terminated prepolymer by reacting a carboxylic anhydride with a polybutadiene having a minor amount of pendant vinyl groups at a temperature from about 125° to about 140° F.; (b) reacting the prepolymer with an excess of liquid epoxy resin at a temperature from about 180° to about 200° F.; (c) adding a vinyl monomer in an amount of about 2% to about 25% of the mixture; and (d) adding epoxy and vinyl polymerization catalysts to cure the mixture.

21 Claims, No Drawings

FLEXIBILIZED CHEMICALLY RESISTANT EPOXY RESIN

This invention is a continuation-in-part of U.S. patent application Ser. No. 338,876 filed Jan. 12, 1982, entitled Flexibilized Chemically Resistant Epoxy Resin, now abandoned.

FIELD OF THE INVENTION

This invention pertains to epoxy resins. More particularly, it pertains to an epoxy resin which is both flexibilized to minimize damage from impact and chemically resistant.

BACKGROUND OF THE INVENTION

Currently available epoxy and vinyl ester resins with good chemical resistance are brittle. FRP pipe lined with these resins often fail at impact generated cracks. Previous attempts to flexibilize epoxy and vinyl ester resins resulted in drastic loss of chemical resistance properties. See, for example, U.S. Pat. Nos. 3,928,491 and 4,018,250; also sales literature distributed by the B. F. Goodrich Company on so-called CTBN and ATBN resins.

An epoxy ester resin has low chemical resistance because its ester linkages are inherently susceptible to hydrolysis.

There is a need for a flexibilized epoxy or vinyl ester resin having good chemical resistance for use with FRP pipe linings, and for coating steel tanks, piping, and concrete.

SUMMARY OF THE INVENTION

Accordingly, this invention provides a flexibilized resin which resists both chemical attack and impact generated cracking. An elastomer is combined with epoxy resin to reduce brittleness and cracking. Ester linkages are limited to four per prepolymer, while a network of vinyl-vinyl and epoxy-epoxy cross-linking impedes dissociation.

In its presently preferred preparation, an intermediate is prepared by reacting a hydroxyl-terminated polybutadiene having a minor amount of pendant vinyl groups with a stoichiometric excess of carboxylic anhydride. Each terminal hydroxyl group reacts with anhydride to form an ester linkage. At both ends of the intermediate, a functional carboxyl group remains from anhydride cleavage.

This intermediate is then reacted with an excess of the liquid epoxy resin selected from flexibilization, which preferably comprises the condensation product of epichlorhydrin and bisphenol-A, and which has at least two terminal epoxy groups. Each of the terminal carboxyl groups of the intermediate forms an ester linkage with a terminal epoxy group from the resin, thereby forming a prepolymer. This step generates modified resin comprising prepolymers having only four internal ester linkages, mixed randomly with the remaining unreacted epoxy resin.

The prepolymer has terminal 1,2-epoxy groups. It also contains a plurality of unsaturated carbon-carbon bonds from the polybutadiene moiety, only a minor portion of which is in the pendant vinyl configurations. At this stage in the preparation of the flexibilized resin, the elastomeric modification, i.e., the polybutadiene moiety, of the diepoxide resin is about 50% by weight of the entire mass.

The modified resin can be blended, as desired, with additional epoxy resin to reduce the percentage of elastomeric modification to whatever is desired, preferably to from about 15% to about 50% and, more preferably, from about 20% to about 25% by weight of the total resinous mass.

A vinyl monomer, preferably vinyl versatate or styrene, is added to the modified resin in an amount from about 2% to about 25% of the total resinous mass.

The curing process involves performing epoxy polymerization and vinyl polymerization. An epoxy polymerization catalyst, preferably a Lewis acid, polyamide imidazole or an aliphatic amine or aromatic amine is added and crosslinks the terminal epoxy groups. Also added is a vinyl polymerization catalyst, preferably a peroxide, azobisisobutyronitritrile or free radical generator for cross-linking vinyl groups in the polybutadiene moiety with the vinyl monomer additive. The cured polymer displays both chemical resistance and flexibility.

DETAILED DESCRIPTION

Flexibilization of epoxy resins is achieved by reacting the resin with a reaction product generated from a hydroxyl terminated elastomer and a carboxylic anhydride. The class of epoxy resins most suitable for flexibilization are diepoxides which have at least about two terminal linking epoxy groups and preferably 2.0 to 2.5 terminal epoxy groups. The epoxy equivalent weight of such diepoxide resins may vary from about 75 up to about 1,000 and is preferably in the range of 150 to 200. Such resins are produced in commercial quantities, for example, by reacting epichlorhydrin with a polyhydroxy compound, for example, bisphenol-A with a caustic liquid. The molecular weight of the resulting resin will depend upon the ratio of epichlorhydrin to polyol employed. The presently preferred diepoxide is a bisphenol-A type diepoxide manufactured by Shell Chemical Company and sold under the trademark Epon 828. It is preferred because of cost. It may be approximately represented by the chemical formula:

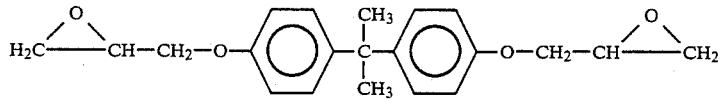

Other diepoxide resins which may be flexibilized include bisphenol-F, phenolic or cresylic novolac, cycloaliphatic, epoxidized oil, and epoxidized polybutadiene type resins. A list of commercially available diepoxide resins suitable for practice of this invention is presented:

| Celanese | EpiRez 508, 509, 510, 520C, 530C, 5027, 5109, 5155, 50727, SU-2.5, SU-3, and SU-4 |
|---|---|
| Cib-Geigy | Araldite 6004, 6010, 6020, 6060, 6084, 7065, 7071, 7072, and 7098, EPN 1138 and 1139, 1142, 1145, and 1148, ECN 1235, |

|  |  |
| --- | --- |
|  | 1273, 2380, and 1299, RD-2, RD-4, CY-178, CY-179, 0163, 0500, 0510, MY-720, XB-2615, and XU-193 |
| Dow | DER-317, 330, 331, 337, 661, 662, 664, DEN-431, 438, and 439 |
| Henkel | Gen Epoxy 185, 190, 525, 625, and 925 |
| Reichhold | Epotuf 37-139, 37-140, 37-301, 37-302, 37-304, 37-308, and 37-340 |
| Shell | Epon 825, 826, 828, 830, 834, 836, 1001, 1002, and 1004 |
| Union Carbide | ERL-4206, 4221, 4234, and 4299 |

A large excess (over two times stoichiometric) of the selected epoxy resin is mixed with an intermediate generated from a hydroxyl terminated elastomer and a carboxylic anhydride. Preferably at least 2.1 to about 25 epoxy groups is provided from the epoxy resin for each carboxyl group provided by the intermediate.

Elastomers suitable for use in this invention have a functional hydroxyl group at each end of the polymer chain and a number of unsaturated carbon-carbon bonds in the interior portion.

Only a minor portion, i.e., less than 50%, of the unsaturated bonds are of the pendant vinyl or vinyl 1,2 type. Polybutadiene moieties having predominant amounts of pendant vinyl groups tend to form rigid six-membered ring structures during vinyl polymerization by reacting pendant vinyl groups on carbon atoms of the polybutadiene backbone. This results in a significant loss of resin flexibility. The number of such six-membered ring structures increases with an increase in the percentage of pendant vinyl groups.

On the other hand, polybutadiene moieties having only a minor amount of pendant vinyl groups tend not to form such six-membered ring structures as a result of few, if any, pendant vinyl groups being on alternate carbon atoms. If formed, such ring structures tend to be isolated, thereby not significantly increasing the rigidity of the resin when polymerized.

A hydroxyl terminated elastomer which has been found satisfactory is manufactured by Arco Chemical Company and sold under the trademark Poly BD R45-HT ("R45-HT"). According to the manufacturer, R45-HT is a hydroxyl terminated butadiene with an average molecular weight of approximately 3,000 and may be approximately represented by the formula:

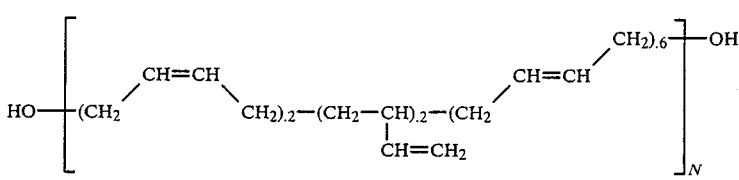

wherein N represents the number of butadiene units per molecule, which number is in the range of fifty. The predominant configuration is Trans 1,4 (60%) with approximately 20% each Cis 1,4 and Vinyl 1,2. The polybutadiene microstructure of R45-HT is similar to that of polybutadiene and SBR copolymers prepared by known methods of emulsion polymerization.

R45-HT is presently preferred because of cost and acceptability under Title 21 (Food and Drugs) of the Code of Federal Regulations, paragraph 121.251U, for resinous and polymeric coatings. Preferably, the terminal hydroxyl groups are primary and sufficiently reactive toward carboxylic anhydrides for practice of this invention. The hydroxyl functionality, i.e., the number of functional hydroxyl groups per molecule, of R45-HT is typically in the range of 2.4 to 2.6.

The intermediate is generated by reacting carboxylic anhydride at both ends of the selected elastomer. The reaction is carried out under conditions such that the anhydride cleaves to form an ester linkage with a terminal hydroxyl group from the elastomer, generating a functional carboxyl group which remains intact. A stoichiometric excess of anhydride molecules relative to hydroxyl groups of the elastomer is used so that essentially all hydroxyl groups of the elastomer are reacted with anhydride. The terminal hydroxyl groups of the elastomer are reacted with the carboxylic anhydride at a relatively low temperature, preferably from about 125° C. to 140° C. and, more preferably, from about 130° C. to 135° C. for about two hours.

It is important that a functional carboxyl group remain intact at each end of the intermediate so that it may later combine with the epoxy resin. Anhydrides typically display ring cleavage toward functional hydroxyl groups at temperatures in the range of from about 125° C. to 140° C. If care is taken to avoid higher temperatures, the carboxyl groups generated during anhydride cleavage remain intact. Reaction of carboxyl groups with additional hydroxyl groups from elastomeric moieties present, which is undesirable, would be expected to generate water. Thus, the temperature of the reaction generating the intermediate is kept purposefully "low", preferably in the range of about 125° to about 140° to control the extent of reaction. In other words, addition of anhydride to elastomer is limited to formation of an ester linkage, preserving a functional carboxyl group upon cleavage of the anhydride ring, and is not carried out to the extent of reacting the remaining carboxyl group of the anhydride moiety. Accordingly, anhydride addition occurs in the essential absence of water evolution.

The anhydride used can be any low weight carboxylic anhydride such as phthalic anhydride, tetrahydrophthalic anhydride, maleic anhydride, succinic anhydride, glutaric anhydride, adipic anhydride, pimelic anhydride, and malonic anhydride. Of these, tetrahydrophthalic anhydride is presently preferred because of approval by the Food and Drug Administration for use in materials intended for human use and consumption.

In the next step of the process, the intermediate is reacted with an excess of epoxy resin to form a long chain prepolymer consisting of an epoxy moiety ester-linked to the intermediate which, in turn, is similarly ester-linked at its opposite end to another epoxy moiety. The epoxy addition to the carboxyl group of the intermediate is preferably performed at about 180° C. to about 200° C. At this point, evolution of water is not a problem because sufficient anhydride was combined with the elastomer in the previous step to tie up essentially all terminal hydroxyl groups of the elastomer in the form of ester linkages. Also, as an excess of epoxy resin is used, the elastomerically modified resin is mixed randomly with the remaining unreacted epoxy resin. At this stage, the elastomer, i.e., polybutadiene, bound in the modified resin is present in a concentration of about 50% by weight of the entire mixture.

A vinyl monomer, preferably vinyl versatate or styrene, is added in an amount of from about 2% to about 25% by weight and preferably from about 5% to about 10% by weight of the mixture to the mixture containing the prepolymer.

The mixture is next diluted with additional epoxy resin. At this stage, the uncured mixture is stable and has a useful shelf life of about six months. The hardness of the final product increases with addition of epoxy resin. At the conclusion of this step, the uncured resin typically is a mixture of long epoxy chains with internal elastomeric modification and having a molecular weight in the range of 3,000 to 5,000, mixed randomly with unreacted diepoxide resins. The polybutadiene moiety is typically on the order of about 15% to about 50% by weight of the overall resin. Mixtures having a polybutadiene moiety concentration of about 20% to about 30% are presently preferred because of their particular hardness and impact resistance. The additional epoxy resin may be added before or after addition of the vinyl monomer resin.

The resin is cured by performing epoxy polymerization and vinyl polymerization. Epoxy polymerization, i.e., cross-linking between terminal epoxy groups from modified resin chains and unreacted epoxy resin, is performed as is known to those skilled in the art, preferably being accomplished with the addition of an epoxy polymerization catalyst, such as an aliphatic or aromatic amine, polyamide, imidazole, or Lewis acid initiators.

Vinyl polymerization is effected by mixing the uncured product with a vinyl polymerization catalyst such as a peroxide, azobisisobutyronitrile or a free radical generator. This causes cross-linking of carbon-carbon unsaturated bonds present in the elastomeric moieties of the modified resin chains and the vinyl monomers.

When the anhydride contains a carbon-carbon unsaturated bond, it can participate in vinyl polymerization. Maleic anhydride and tetrahydrophthalic anhydride, for example, contain such an unsaturated bond which may contribute to the hardness of cured resins incorporating these anhydrides.

In the presently preferred embodiments, the epoxy and vinyl polymerization catalysts are present in a maximum combined concentration of about 30% by weight of the entire reaction mixture. Generally, the vinyl polymerization catalyst is in a concentration of from about 0.5% to 2% by weight of the entire reaction mixture.

It is not necessary for one skilled in the art to know or understand the details of the reactions involved in order to make or use the resins of the invention. Nevertheless, such reactions are a matter of interest and the following reactions are, therefore, given as those believed to be involved in forming the prepolymers of the invention. However, applicant makes no representation that the indicated reactions actually occur or that other or different reactions do not occur. The reactions are:

1. The elastomer+anhydride to form intermediate:

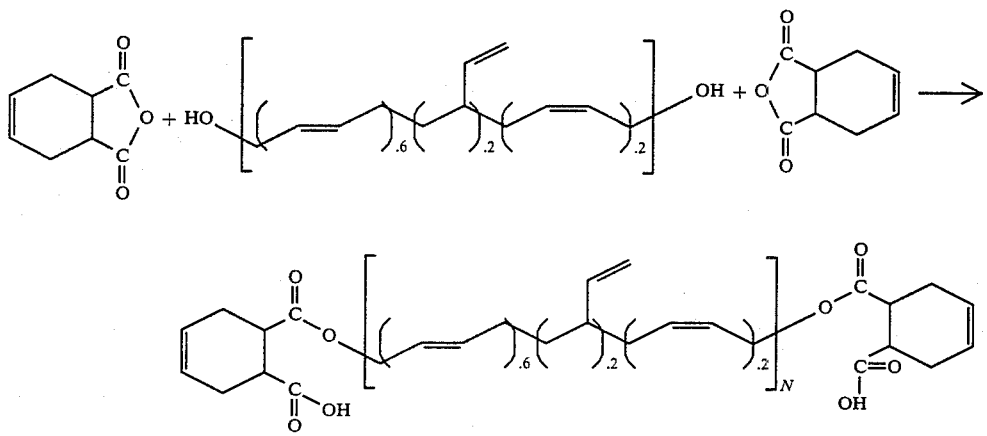

2. Diepoxide resin+intermediate to form prepolymer:

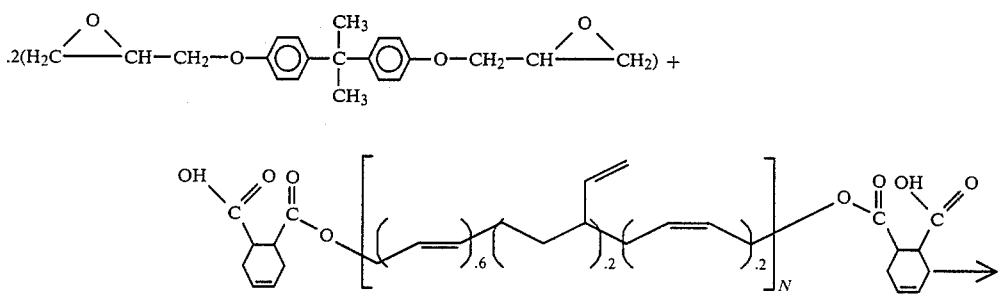

-continued

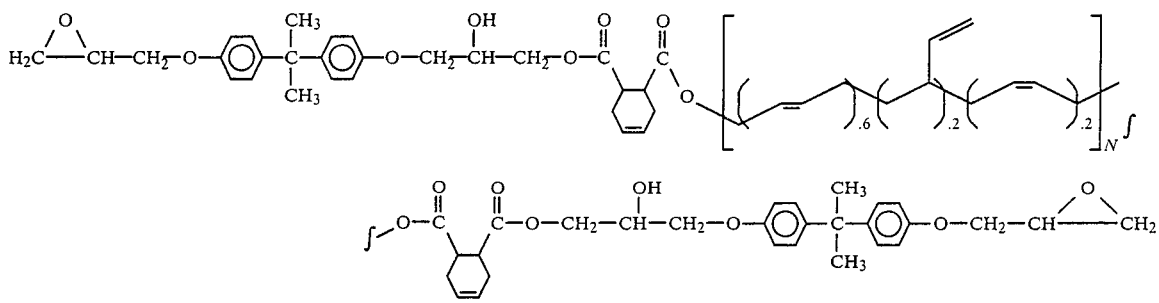

It is believed that the marked chemical stability of the cured product is due to limiting ester linkages to four per uncured polymer chain, concurrent epoxy, and vinyl polymerization, and the random admixing of modified epoxy chains with unreacted resin. On either side of the elastomer, a pair of ester linkages remains from the anhydride which linked the elastomer to an epoxy resin. Ester linkages are susceptible to hydrolysis and represent a source of chemical instability. This weakness has been neutralized by the cross-linking between, on the one hand, epoxy and epoxy groups and, on the other hand, vinyl and vinyl groups, which both resist chemical attack. The dual cross-linking holds the cured polymer chains together even in the instance of hydrolysis of some ester linkages. The network of epoxy and vinyl crosslinking provides a macromolecular structure which sterically hinders dissociation of the entire mass unless hydrolysis of essentially all ester linkages occurs, which is statistically an unlikely event. Even then, the random distribution of ester linkages through the epoxy mass makes it unlikely that the entire product will dissolve. Accordingly, the cured product is chemically resistant. It is also impact resistant and flexible because of the elastomer present. Elongations of from 20% to 40% have been found.

Method of Preparation

In flexibilizing an epoxy resin according to this invention, a hydroxy-terminated polybutadiene having a minor portion of pendant vinyl groups is selected and combined with a stoichiometric excess of carboxylic anhydride under conditions such that essentially all terminal hydroxyls from the elastomer are reacted to form ester linkages with anhydrides, forming an intermediate having functional terminal carboxyl groups remaining from the anhydride. Typically, the reaction is carried out at a temperature of no more than about 140° C. and preferably at about 130° C. to 135° C. An excess of the epoxy resin to be flexibilized is then mixed with the intermediate by heating to a suitable reaction temperature, generally at about 170° C. to about 190° C. Heating of the reaction mixture continues until the acid value diminishes to a low level, preferably less than 10, i.e., a one gram sample of the mixture requires less than 10 mg of potassium hydroxide to neutralize the acid in the sample. This indicates substantially complete reaction between the two reactants, i.e., that the product is substantially free of unreacted carboxyl groups. The resulting resin is directly recovered as a polymerizable resinous substance. This prepolymer is then diluted with sufficient additional selected diepoxide resin to reduce the presence of elastomeric modification to whatever is desired, preferably from about 20 to about 30% by weight. This step yields a mass of uncured polymer.

A vinyl monomer such as esters of carboxylic acids, vinyl toluene, or styrene is added preferably in an amount of from about 5% to about 10% by weight of the uncured mass.

The latter mixture is cured by performing epoxide polymerization and vinyl polymerization. The epoxide polymerization is initiated by addition of an epoxy curing catalyst, such as an aromatic amine or Lewis acid, while vinyl polymerization is initiated by addition of a vinyl curing catalyst such as a peroxide or azobisisobutyronitrile.

EXAMPLES

The following examples and table present preliminary chemical resistance testing of various resins compounded according to the present invention and epoxy resins which lack elastomeric modification. The resins were made into castings and immersed in the indicated chemical solutions at the indicated temperature for 12 months. The castings were weighed before and after immersion to determine the degree of absorbency (gain) or decomposition (loss), if any. A percentage change of within about ±10% indicates that the resin would be a good candidate for the resin component of a fiberglass-wound pipe. The legend "FAIL" indicates that the sample was too crumbly to permit reliable post-immersion weighing. The laboratory procedure used in carrying out each of the Examples 1-15 is as follows:

Examples 1-3 are of an elastomerically modified epoxy resin which has been cured with concurrent epoxy and vinyl polymerization. Examples 4-7 are of an elastomerically modified epoxy resin which has been cured only by epoxy curing. The remaining Examples 8-15 are of an epoxy resin lacking elastomeric modification which has epoxy curing.

For Examples 1-7, stoichiometric amounts of the elastomer Poly BD-R45HT (1 equivalent) and maleic anhydride (2 equivalents) were placed in a resin kettle equipped with a heating mantle, thermometer, and airtight stirrer. With continuous stirring, the mixture was heated to a temperature of 130° C. to 140° C. and maintained there for approximately one-half to two hours. Diepoxy resin Epon 828 (5.57 equivalents of epoxide) was added with stirring and the mixture was heated to about 170° C. to 180° C. and maintained there until the acid number was reduced to a value of 10 or less (approximately 3 to 4 hours). This generated approximately 50% elastomerically modified Epon 828 resin. A second addition of Epon 828 epoxy resin was made later at room temperature to reduce the percentage of elastomeric modification to the indicated level (either 20 or 25%). The resins were cured as an epoxy casting by adding maleic anhydride, Shell VV10 vinyl versatate, 3.0 weight percent Leecure B550 Lewis acid catalyst plus 1% ditertiary butyl peroxide as initiator and heating continuously for 10 minutes at 125° C., 10 minutes at 150° C., 10 minutes at 175° C., and 30 minutes at 200° C. The castings were then immersed in the indicated reagents at the indicated temperatures and left for a period of 12 months to test their chemical resistance.

The compositions of Examples 1–3 are:

|  | Example 1 | Example 2 | Example 3 |
|---|---|---|---|
| Epoxy Epon 828 | 22.0% | 22.0% | 36.0% |
| 50% Elastomer Modified Epoxy (R45HT) | 50.0% | 50.0% | 40.0% |
| Maleic Anhydride | 1.5% | 1.5% | 1.25% |
| Vinyl Curing Agent (Shell VV10 vinyl versatate) | 22.5% | 22.5% | 18.75% |
| Epoxy Curing Agent (Lewis acid-Lepoxy Plastics Leecure B550) and | 3.0% | 3.0% | 3.0% |
| ditertiary butyl peroxide | 1.0% | 1.0% | 1.0% |
|  | 100.0% | 100.0% | 100.0% |
| Elastomer Content | 25.0% | 25.0% | 20.0% |

Examples 4–7 were prepared the same as Examples 1–3 with the exception that curing was done only with an epxoy catalyst (an aromatic amine, Ancamine 1482), but no vinyl curing was attempted.

The compositions for Examples 4–7 are:

|  | Example 4 | Example 5 | Example 6 | Example 7 |
|---|---|---|---|---|
| Epoxy |  |  |  |  |
| Epon 828 | 47.76% | 38.8% |  |  |
| ERL-4026 |  |  | 30.64% | 37.72% |
| 50% Elastomer Modified Epoxy (R45-HT) | 40.00% | 50.00% | 50.00% | 40.00% |
| Epoxy Curing Agent (Ancamine 1482) | 12.24% | 11.20% | 19.36% | 22.28% |
| Elastomer Content | 20.00% | 25.00% | 25.00% | 20.00% |

Examples 8–15 are prepared by mixing the indicated amount of epoxy curing agent with the epoxy resin (Epon 828 in all examples except Example 11) and heating continually for 10 minutes at 125° C., 10 minutes at 150° C., and 30 minutes at 163° C. The compound is then immersed in the indicated reagent. Their compositions:

|  | Example 8 | Example 9 | Example 10 | Example 11 |
|---|---|---|---|---|
| Epoxy (Epon 828) | 80.00% | 84.03% | 81.00% | (pre catalyzed resin) |
| Curing Agent Type | 20.00% Shell Y Aromatic Amine | 15.97% Ancamine 1482 Aromatic Amine | 19.00% Texaco Jeffamine AP22 Aromatic Amine | General Electric Arnox 3110 Lewis acid |

|  | Example 12 | Example 13 | Example 14 | Example 15 |
|---|---|---|---|---|
| Epoxy Resin (Epon 828) | 84.03% | 78.12% | 79.56% | 81.00% |
| Curing Agent |  |  |  |  |
| Ancamine 1482 | 15.97% |  |  |  |
| Tonox T22 |  | 21.88% | 20.44% | 19.00% |

(aromatic amine)

A table listing the percentage twelve month weight changes of Examples 1–15 immersed in the indicated reagents is presented:

|  | Example 1 | Example 2 | Example 3 | Example 4 |
|---|---|---|---|---|
| 20% $H_2SO_4$ | −7.13 | −4.67 | −0.98 | +5.42 |
| 70% $H_2SO_4$ | +1.72 | Fail | +7.19 | Fail |
| 37% HCl | +3.19 | +5.89 | +6.14 | +12.40 |
| 85% $H_3PO_4$ | −4.84 | −2.66 | −0.22 | Fail |
| 20% Acetic Acid | −6.57 | −3.78 | +0.09 | +1.14 |
| 20% NaOH | −7.95 | −1.83 | −2.46 | +2.44 |
| 50% NaOH | −9.42* | −6.91 | −2.63* | −2.72 |
| 10% NaOCl | −17.75 | −13.15 | −14.23 | −23.32 |
| Deionized $H_2O$ | −8.45 | −5.59 | −1.26 | +0.12 |
| Acetone | −8.55 | −7.95 | −3.90** | +3.19 |

*50% NaOH container empty at inspection time. Weight values may not be accurate.
**Badly cracked. Failed

|  | Example 5 | Example 6 | Example 7 | Example 8 |
|---|---|---|---|---|
| 20% $H_2SO_4$ | +5.06* | Fail | Fail | +15.29 |
| 70% $H_2SO_4$ | Fail | Fail | Fail | Fail |
| 37% HCl | +13.34 | Fail | Fail | +11.63 |
| 85% $H_3PO_4$ | Fail | Fail | Fail | Fail |
| 20% Acetic Acid | +2.03 | +8.54 | +12.66 | +3.43 |
| 20% NaOH | +0.25 | +2.51 | +2.23 | −1.52 |
| 50% NaOH | −2.72 | −2.19 | −1.60 | −0.70 |
| 10% NaOCl | −33.07 | Fail | Fail | −10.82 |
| Deionized $H_2O$ | +0.25 | +1.00 | +1.56 | +2.11 |
| Acetone | −2.68 | +11.77 | +8.88 | +10.29 |

|  | Example 9 | Example 10 | Example 11 | Example 12 |
|---|---|---|---|---|
| 20% $H_2SO_4$ | +27.55* | +17.88* | +0.29* | +8.96 |
| 70% $H_2SO_4$ | Fail | Fail | Fail | Fail |
| 37% HCl | +19.30 | +12.53 | +2.49 | +15.14 |
| 85% $H_3PO_4$ | Fail | Fail | −0.11 | Fail |
| 20% Acetic Acid | +3.41 | +3.72 | +3.63 | +2.98 |
| 20% NaOH | −2.71 | −0.02 | +0.26 | −4.19 |
| 50% NaOH | −0.97 | −0.48 | −0.59 | −0.62* |
| 10% NaOCl | −13.67 | −7.03 | −4.08 | −24.73 |
| Deionized $H_2O$ | +2.06 | +2.69 | +1.40 | +1.99 |
| Acetone | +11.41 | +5.58 | Fail | +3.25 |

*20% $H_2SO_4$ container empty at inspection time. Weight values may not be accurate.

|  | Example 13 | Example 14 | Example 15 |
|---|---|---|---|
| 20% $H_2SO_4$ | +18.25 | +14.66 | +14.77 |
| 70% $H_2SO_4$ | Fail | Fail | Fail |
| 37% HCl | +16.14 | +15.32 | +13.28 |
| 85% $H_3PO_4$ | Fail | Fail | Fail |
| 20% Acetic Acid | +3.57 | +3.66 | +4.18 |
| 20% NaOH | −1.67 | −1.14 | −0.54 |
| 50% NaOH | −0.29* | −0.21* | −0.03* |
| 10% NaOCl | −13.16 | −10.44 | −10.10 |
| Deionized $H_2O$ | +2.43 | +2.76 | +3.28 |
| Acetone | +2.70 | +3.49 | Fail |

*50% NaOH container empty at inspection time. Weight values may not be accurate.

All immersions were at 93° C. except for the 10% NaOCl at 65° C. and acetone at room temperature. Weight change figures within about ±10% are considered acceptable for use in a fiberglass wound pipe.

As shown from the above examples, the chemical resistance of the elastomerically modified resins having concurrent epoxy and vinyl curing (Examples 1–3) is generally at least as good or better than the chemical resistance of the rubber modified aromatic amine cured resins (Examples 4–7) and better than the simple epoxy resins (Examples 8–15). The best performance of Examples 1–3 is with strongly acidic environments, while unsatisfactory performance was encountered with hypochlorite immersion. However, deterioration in hypochlorite occurred to every resin except Examples 10 and 11, which included epoxy curing agents unique to the tested series. Of course, all of the elastomerically modified resins (Examples 1–7) are flexible relative to the simple epoxy resins (Examples 8–15) and have a correspondingly greater impact resistance.

The resin of Example 1 was also tested to determine its percent elongation. Such testing was conducted using an Impact-Flexibility Tester, developed by General Electric Co. A percent elongation of between 20% and 40% was achieved.

The flexible cured resins of the invention find particular application as crack resistant, chemically resistant liners for reinforced plastic pipe. In forming such pipe, reinforcing material, such as fiberglass C veil saturated with resin, is wound upon a mandrel. This forms a resin-rich liner for the pipe. Successive layers of resin-wetted fiberglass roving are then helically wound around the mandrel to build up the desired pipe wall thickness. The mandrel plus windings are baked to cure the resin, after which the mandrel is withdrawn from the pipe.

Improved pipe may be provided by using a flexibilized, chemically resistant resin according to the present invention as the resin component of the resin-rich pipe liner. A conventional rigid resin may optionally be used in the outermost layer of fiberglass roving to form a glass-rich pipe wall.

What is claimed is:

1. A method for flexibilizing an epoxy resin having at least two terminal epoxy groups comprising:
   (a) preparing a dicarboxy-terminated prepolymer by reacting a stoichiometric excess of a carboxylic anhydride with each hyroxyl equivalent of a polybutadiene having terminal allylic hydroxyl groups and a minor amount of pendent vinyl groups, at a temperature of from about 125° to about 140° and for a time sufficient for substantially all of the terminal hydroxyl groups to form first ester linkages with anhydride molecules resulting in a prepolymer having a functional carboxyl group at each end;
   (b) reacting an excess of a liquid epoxy resin with each carboxyl equivalent of the dicarboxy-terminated prepolymer at a temperature of from about 180° F. to about 200° F. for a time sufficient to yield an elastomerically modified resin having at least two terminal epoxy groups, the epoxy resin in such elastomerically modified resin being linked to the prepolymer via a second ester linkage;
   (c) mixing a vinyl monomer in an amount of from about 2% to about 25% by weight of the elastomerically modified resin with the elastomerically modified resin to yield an uncured product; and
   (d) mixing epoxy and vinyl polymerization catalysts to the uncured product to effect epoxy copolymerization and vinyl copolymerization to thereby yield a cured flexibilized resinous mass.

2. A method according to claim 1 further comprising prior to step (d): diluting the elastomeric modified resin with sufficient additional epoxy resin to yield an uncured mass wherein the polybutadiene moiety comprises from about 15% to about 50% by weight of the uncured mass.

3. A method according to claim 2 wherein the concentration of the polybutadiene moiety is from about 20% to about 30% by weight of the uncured mass.

4. A method according to claim 1 wherein the vinyl monomer is selected from the group consisting of vinyl versatate, styrene, vinyl toluene, and mixtures thereof.

5. A method according to claim 1 wherein the concentration of vinyl monomer is from about 5% to 10% by weight of the resinous mass.

6. A method according to claim 1 wherein the epoxy copolymerization catalyst is selected from the group consisting of aromatic amines, polymides, imidazolines, and Lewis acids.

7. A method according to claim 1 wherein the vinyl copolymerization catalyst is selected from the group consisting of peroxides, azobisisobutyronitrile, and free radical generators.

8. A method according to claim 1 wherein the carboxylic anhydride contains a carbon-carbon unsaturated bond.

9. A method according to claim 1 wherein the reaction of step (a) is performed at a temperature of from about 130° C. to 135° C.

10. A method according to claim 9 wherein the reaction of step (a) is performed for about two hours.

11. A method for flexibilizing an epoxy resin comprising:
   (a) ester linking a liquid epoxy resin having at least two terminal epoxy groups with a polybutadiene moiety having at least two terminal hydroxyl groups and a minor amount of pendent vinyl groups to thereby form an elastomerically modified resin by reacting each hydroxyl equivalent of the polybutadiene moiety with a stoichiometric excess of a carboxylic anhydride at a temperature sufficiently low to essentially prevent the evolution of water to thereby generate a precursor having a functional carboxyl group at each end, and then, reacting an excess of the epoxy resin with each carboxyl equivalent of the precursor at a sufficient temperature and for a time sufficient to reduce the acid value of the reaction mixtures to less than about 10 to thereby generate the elastomerically modified resin;
   (b) mixing a vinyl monomer in an amount of from about 2% to about 25% by weight of the elastomerically modified resin with the formed elastomerically modified resin to form an uncured mass; and
   (c) concurrently copolymerizing epoxy groups and copolymerizing vinyl groups by adding epoxy and vinyl polymerization catalysts to the uncured mass to yield a flexibilized epoxy resin.

12. A method according to claim 11 wherein the vinyl monomer is selected from the group consisting of vinyl versatate, styrene, vinyl toluene, and mixtures thereof.

13. A method according to claim 11 wherein the anhydride contains a carbon-carbon unsaturated bond.

14. A curable resin composition comprising an admixture of a vinyl monomer and a prepolymer formed by reacting at a temperature of from about 180° to about 200° F. a liquid diepoxide resin with the product formed by reacting of a polybutadiene moiety having at least two terminal hydroxyl groups and a minor amount of pendent vinyl groups and a carboxylic anhydride at a temperature of from about 125° to about 140° F., wherein approximately one chemical equivalent of carboxylic anhydride is provided for each equivalent of terminal hydroxyl groups supplied by the polybutadiene moiety, and wherein at least two chemical equivalents of epoxide are provided by the diepoxy resin for each equivalent of anhydride.

15. The resin composition of claim 14 wherein the anhydride is selected from the group consisting of tetrahydrophthalic anhydride and maleic anhydride, and the polybutadiene moiety is generated from a diolefin butadiene.

16. The resin composition of claim 14 wherein the vinyl monomer is selected from the group consisting of vinyl versatate, styrene, vinyl toluene, and mixtures thereof.

17. The resin composition of claim 14 further comprising an epoxy curing catalyst selected from the group consisting of aromatic amines, polyamides, imidazolines, and Lewis acids and a vinyl curing catalyst selected from the group consisting of peroxides, azobisisobutyronitrile and free radical generators.

18. The resin composition of claim 17 wherein the maximum concentration of the epoxy and vinyl curing catalysts is about 30 percent by weight.

19. The resin composition of claim 14 wherein the polybutadiene moiety is present in a concentration of from about 15 to about 50% by weight.

20. The resin composition of claim 14 wherein the polybutadiene moiety is present in a concentration of from about 20% to about 30% by weight.

21. A curable flexibilized epoxy resin composition comprising a vinyl monomer and a prepolymer of the general formula:

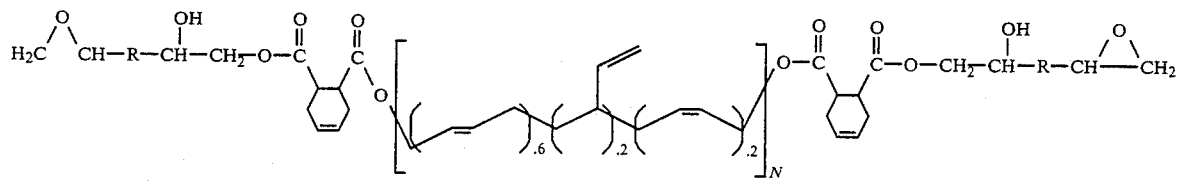

wherein N is a polymerization index of the polybutadiene moiety and has a value of about 50;

wherein R is the portion of a diepoxy resin moiety between the terminal epoxide groups; and wherein N and R are selected so that the polybutadiene moiety has a weight percent of from about 15 to about 50 of the prepolymer.

* * * * *